Dec. 8, 1942.                 M. D. McCARTY                    2,304,738
                                SEISMOGRAPH
                           Filed June 29, 1939          2 Sheets-Sheet 1
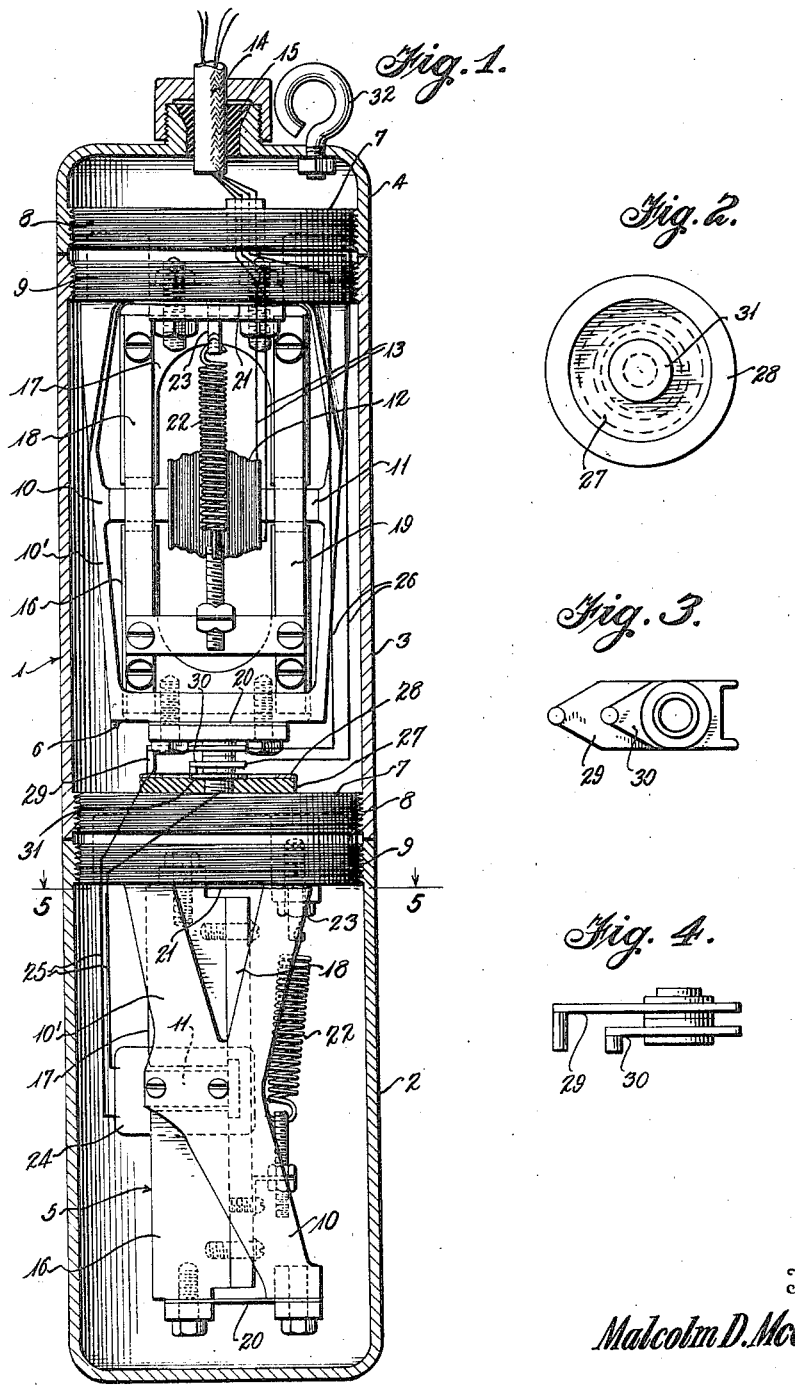
Inventor
Malcolm D. McCarty
By Walles R. Lamont
Attorney Inventor
Malcolm D. McCarty
Wallas R. Lamont
Attorney Patented Dec. 8, 1942

2,304,738

UNITED STATES PATENT OFFICE 2,304,738

SEISMOGRAPH

Malcolm D. McCarty, Dallas, Tex., assignor, by mesne assignments, to Socony-Vacuum Oil Company, Incorporated, New York, N. Y., a corporation of New York Application June 29, 1939, Serial No. 281,958

1 Claim. (Cl. 177—352)

This invention relates to improvements in seismic prospecting methods and apparatus and is directed more particularly to a method and apparatus for recording seismic waves by means of an improved type of geophone.

In the art of seismic prospecting it is customary to creatic seismic waves in the surface of the earth by detonating a charge of explosives. These waves emerging from the point of detonation travel by various paths, and are detected by suitable detecting devices commonly known in the art as geophones. These detecting devices, or geophones, generate electrical signals that are in sympathy with the seismic waves detected and after amplification are recorded by means of a recording galvanometer. The recording galvanometer has associated with it means for indicating the instant of detonation and a timing device for placing time indications on the record at regularly spaced time intervals. From the record made in this manner one is able to obtain all the data necessary from which to determine the dip of sub-surface strata and make depth profiles of the strata forming the surface of the earth.

A record made in the above described manner consists of direct travelling waves, those waves travelling directly from the point of detonation of the explosive to the detecting units, and reflected waves, those waves which travel downwardly from the point of detonation of the explosive charge to sub-strata interfaces and are reflected back to the detecting units. In addition to generating these beneficial waves at the point of detonation of the explosive charge, many other wave components are created in the earth's surface which have no beneficial significance. Moreover, some of these undesirable components oftimes impair the value of the seismogram in that they tend to obliterate or obscure those signals from which useful data are obtained. In many localities a slow traveling surface wave is created, commonly known in the art as "ground-roll," which due to its low velocity and high energy content tends to obscure reflections arriving from shallow sub-strata interfaces.

As illustrated by the prior art, numerous attempts, which have not proven entirely successful, have been made to eliminate the harmful effects of this slow travelling surface wave. The instant invention is believed to provide a definite solution to this problem.

In exploring certain areas by seismic prospecting methods, the noise level, due to locally existing conditions, is extremely high and by using the normal detecting devices, it is extremely difficult to record reflected wave energy with sufficient magnitude that the onset of the reflected wave signals are distinguishable. Efforts have been made to survey areas where these unfavorable conditions exist by using a plurality of these detecting units connected in multiple to give increased reflected signal strength which would stand out over the signals resulting from the local disturbances which have been recorded. Such an arrangement introduces objectionable features such as unbalancing the amplifier by changing the impedance of the input circuit, the necessity for burying a plurality of units at a particular detecting station, the use of detecting units having dissimilar characteristics and improper connection of the units one to the other.

Applicant overcomes these difficulties by incorporating a plurality of detecting units, adapted to oscillate vertically, in a single case, the magnitude of the signal generated by each unit being dependent upon the impulse that sets the case in motion.

This invention in addition to having the advantages enumerated above also permits of a method of seismic surveying which will give on a recorded seismogram a record that will be an actual physical over-lap between detecting stations. This feature is of paramount importance in that it is an aid in the interpretation of the seismogram. That is, a record formed in this manner will enable the interpreter to follow the reflected signals from an outside trace on the seismogram completely across all traces recorded thereon. This method of recording is particularly advantageous in continuous profile work. Oftimes it is desirable to lay spreads, for convenience, along the highways adjacent power transmission lines. Since the frequency of the power being transmitted over these lines is so close to that of the frequency of the signals that it is desired to record, difficulties are encountered due to electrical pick-up by the instruments. With the apparatus herein disclosed, by proper orientation of the units within the casing, this difficulty is obviated.

In addition to the above recited advantageous features, the multiple unit forming the subject matter of this application, is compact and readily adjustable to meet the needs encountered in any particular area that it is desired to explore.

Therefore, the primary object of this invention resides in a method of seismic survey that can be practiced by the use of a novel apparatus in the form of a compact multiple unit geophone that can be readily adjusted to meet the needs encountered in a particular area that it is desired to explore.

Another object of this invention resides in the provision of a method for eliminating objectionable "ground-roll" by the use of multiple units which can be spaced in a collinear plane with the shot at intervals of approximately ½ the wave length of the "ground-roll" wave.

Still another object of this invention resides in the provision of an apparatus whereby seismograph traces which result from physically overlapping detecting stations can be recorded.

This invention further contemplates the provision of a geophone that comprises a casing having mounted therein, adapted for vertical oscillation, two identical units one of which can be oriented relative to the other.

Another object of this invention resides in the provision of means whereby reflected waves received by two detecting elements can be combined for purpose of emphasizing reflected wave energy over that of signals resulting from high noise levels.

This invention also contemplates the provision of a compact unit having enclosed in a single casing independent vibrating elements adapted to be oriented one with respect to the other for the purpose of eliminating electrical pick-up.

Other objects and advantages will become apparent from the following detailed description when considered with the attached drawings in which:

Figure 1 is an elevational view of the device showing the casing in cross section;

Figure 2 is a plan view of the contactor carried by the bottom end;

Figure 3 is a bottom view of the contacting arms carried by the top element;

Figure 4 is a side view of the contactors shown in Figure 3;

Figure 5:
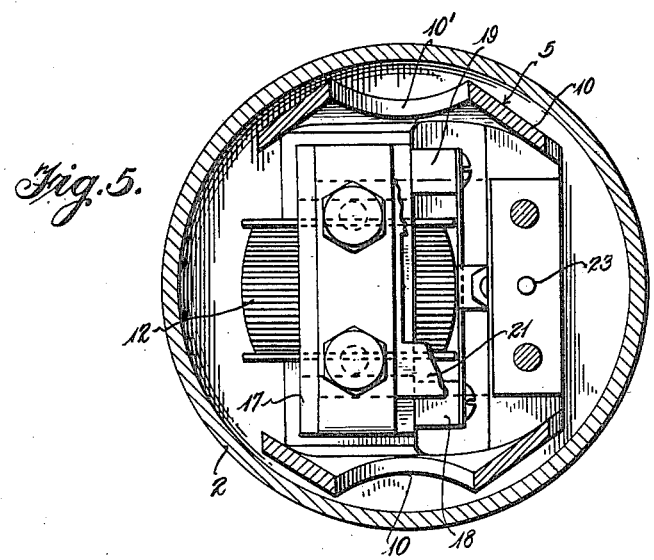
Figure 5 is a cross sectional view of the apparatus taken along the lines 5—5 of Figure 1.

Referring to the drawings in detail and particularly Figure 1, there is shown a casing 1 comprising three parts, a bottom part 2, an intermediate part 3 and a cap 4. Mounted within the casing 1 are two identical detecting units 5 and 6, differing only in their electrical connections. Inasmuch as the two units are identical, a detailed description of the mechanical construction of only one will be given. Each unit has formed on the top thereof a cylindrical plug 7 whose peripheral surface is threaded at 8 and 9, the bottom set of threads 9 being adapted to engage the bottom portion 2 of the casing, while the top set of threads 8 are adapted for engagement with the middle portion 3 of the casing. These two sets of threads serve to join the two sections of the casing together. Pending from this cylindrical plug 7 is a stirrup 10 having substantially Y-shaped side arms 10'. A core 11 is secured between the Y-members 10' and carried thereby in substantially horizontal position. A winding 12 formed about the core 11 is provided with electrical conductors 13 which are brought upwardly through the cylindrical plug 7 in the top of the casing and outside through an insulating sleeve 14 and conventional packing 15.

Figure 6:
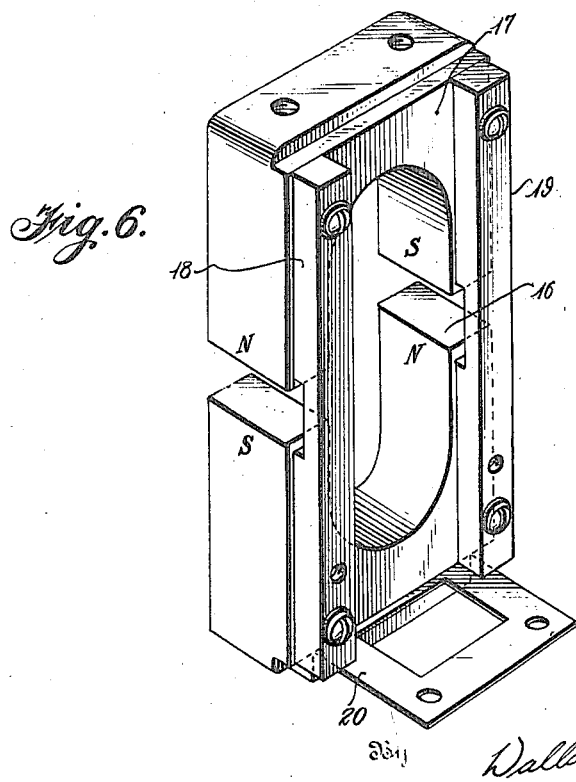
Figure 6 is a perspective view of one of the inertia assemblies.

Referring particularly to Figure 6, an inertia assembly is formed by securing two substantially horse-shoe shaped permanent magnets 16 and 17 in a position such that unlike poles of the respective magnets are spaced from each other a distance slightly greater than the thickness of the armature 11. The magnets 16 and 17 are held in spaced relationship by bars 18 and 19 which have been formed from a non-magnetic metal, such as brass.

The inertia assembly is resiliently mounted by means of the leaf springs 20 and 21 in the stirrup in such a manner that the armature 11 is disposed between the pole faces of the two magnets. By resiliently mounting this inertia assembly, it will oscillate in a vertical plane relative to the armature 11. Since the armature 11 completes the magnetic circuit for these magnets, any change in the length of the air gaps between the pole faces of the magnets and the armature, due to oscillation of the magnetic assembly, will produce changes in the flow of flux through the armature which will generate a voltage in the winding 12 carried by the armature. This voltage generated in the winding 12 is conducted to the input of a suitable amplifier where it is amplified and then recorded by a conventional recording galvanometer.

In order to compensate for the weight of the magnetic assembly and properly space the pole faces of the magnets from the armature 11, a compensating spring 22 is used. The upper end of this compensating spring is secured by suitable fastening means 23 to the cylindrical plug 7, while the lower end of the compensating spring is adjustably secured to the magnetic assembly. By properly tensioning the spring 22 the air gaps above and below the armature 11 can be equalized so that when the inertia assembly is stationary, relative to the armature and casing, the reluctance of both the upper and lower magnetic paths will be substantially equal and the flux through one path will balance that in the other path. This condition will exist until an impulse is delivered to the case 1 that will cause movement of the armature 11 relative to the inertia assembly. Any relative movement of these parts will cause a change in the flux flowing in the armature 11 which in turn will generate voltages that are in sympathy with the movement of the case 1.

The armature coil 24 of the bottom detecting unit 5 is provided with conductors 25 that are connected at their upper ends to the rotary contactor whose elements are shown in detail in Figures 2, 3 and 4. Connection is made through this rotary contactor to conductors 26 which are brought up through the top cylindrical plug 7 and out through the insulating sleeve 14 in a similar manner to that described in connection with conductors 13.

The rotary contactor consists of a disc 27 of insulating material that is secured to the top of the lower cylindrical plug 7. A conducting ring 28 is secured to the upper face of the disc 27 and is adapted to make electrical contact with the arm 29 that is secured to, but insulated from, the bottom of the detecting unit 6. A second contacting arm 30 carried by the bottom of the upper detecting unit 6, but insulated from both the detecting unit and the arm 29, is adapted to make contact with a conducting disc 31 that is secured to the center of the insulating disc 27. By using a rotary contactor of this character it is possible to rotate one of the units relative to the other for the purpose of orientation.

In order to facilitate handling of these units, the casing 1 is provided at the top thereof with an eye-bolt 32 through which can be passed a chain, rope or other means whereby the apparatus is made portable.

In conducting seismic surveys these new type multiple geophones can be spaced from the shot point and from each other in the conventional manner. Due to the fact that each geophone contains two detecting units, advantageous combinations of external connections can be made. Where the geophones are located adjacent power transmission lines, the units in each casing can be oriented with respect to each other for the purpose of eliminating electrical pick-up. The two units can be connected either in series or parallel with each other for the purpose of producing increased signal strength.

Still another important arrangement of the geophones is that a detecting unit in one case can be connected in series or parallel with a detecting unit in another for the purpose of eliminating by cancellation signals such as those produced by slow travelling earth waves and forming a record, each trace of which will be an actual physical overlap between two detecting stations in a spread. Other combinations of connections when using the new multiple type geophone will become apparent to those skilled in the art.

I claim:

An electrical seismograph detecting unit comprising in combination a case, top and bottom independent detecting units vertically disposed within said case, means for mounting said units in said case for oscillation in vertical planes, each detecting unit having a horizontally disposed coil, means forming a rotary contactor for making an electrical connection between the bottom detecting unit and the conductors that are adapted to conduct the electrical signals, which have been generated by the bottom unit, to a point outside the case whereby said units can be rotated relative to each other to place their coils in hum-bucking relationship.

MALCOLM D. McCARTY.